United States Patent

[11] 3,624,441

| [72] | Inventors | Max E. Todd;<br>John V. Hellmann, both of Anderson, Ind. |
| --- | --- | --- |
| [21] | Appl. No. | 45,040 |
| [22] | Filed | June 10, 1970 |
| [45] | Patented | Nov. 30, 1971 |
| [73] | Assignee | General Motors Corporation<br>Detroit, Mich. |

[54] FIELD FRAME ASSEMBLY FOR DIRECT CURRENT DYNAMOELECTRIC MACHINES
2 Claims, 2 Drawing Figs.

[52] U.S. Cl. .................................................. 310/179,
310/89, 310/177, 310/258
[51] Int. Cl. .................................................. H02k 1/00
[50] Field of Search........................................... 310/179,
173, 177, 154, 254, 258, 259, 260, 269, 181, 185,
180, 188, 152, 257, 155, 256, 86, 85, 89

[56] References Cited
UNITED STATES PATENTS

| 3,154,708 | 10/1964 | Shaffer.......................... | 310/258 |
| --- | --- | --- | --- |
| 3,366,813 | 1/1968 | Madsen......................... | 310/86 |
| 1,159,121 | 11/1915 | Starker.......................... | 310/258 |
| 2,582,005 | 1/1952 | Carlson......................... | 310/258 |
| 1,564,389 | 12/1925 | Wheeler........................ | 310/258 |

Primary Examiner—D. F. Duggan
Assistant Examiner—R. Skudy
Attorneys—E. W. Christen and C. R. Meland ABSTRACT: A field frame assembly for a DC motor which includes two end frames joined with a field member. The field member cross section has a serpentine configuration providing integral salient poles and an undulating exterior contour. A field coil is secured in a fixed relation to the salient poles and the field member provides a substantially constant cross section path for flux emanating from the field coil. The end frames afford mounting means for the DC motor and bearing support for the motor's rotor.

PATENTED NOV 30 1971

3,624,441

INVENTORS
Max E. Todd &
BY John V. Hellmann

C.R. Meland
ATTORNEY

FIELD FRAME ASSEMBLY FOR DIRECT CURRENT DYNAMOELECTRIC MACHINES

This invention relates to a field frame assembly for a direct current dynamoelectric machine.

It is known in the art of direct current dynamoelectric machines to fabricate light gauge field frame assemblies having integral poles by depressing portions of tubing to form polar projections. A concomitant of this fabrication process is necking of the tubular material at the radii associated with the depressions. A unit assembly field frame of this type is shown in the patent to Koppitz 1,327,619.

In known field frame assemblies having wall thicknesses on the order of one-quarter inch or more, such as those used in automobile cranking motors, a cylindrical, tubular member is utilized as a frame and as a field member. In these prior art heavy gauge field frames, separate salient pole shoes are secured to the tubular member to accommodate a field winding. These pole shoes require only a fraction of the length of the tubular member. However, the entire tubular member has a uniform material thickness equal to that required in the vicinity of the poles to accommodate circulating flux during motor operation. These field frame assemblies are typified by patents to Hartzell et al. 2,839,935 and to Redick et al. 3,020,771.

In contrast to these known field frames, the field frame assembly of the present invention utilizes a heavy gauge field member having a serpentine configuration providing integral salient poles in conjunction with two light gauge end frames. The end frames which are joined with the field member are fabricated from material having a thickness substantially less than the thickness of the field member and, consequently, a material savings is realized. In view of the serpentine design of the field member, the variance in radial thickness of the field member from the poles to regions intermediate the poles is reduced when compared to conventional heavy gauge field frame designs. Accordingly, a material savings is realized by the reduction of the thickness of the field member at its poles. Additional material savings result from the fact that the field member need only be as long as its integral poles and, as noted, light gauge end frames are used to perform the necessary mounting and support functions. Additionally, it is noted that by making the integral poles the same length as the field member, the assembly of the field coils to the field member is simplified.

Accordingly, it is an object of this invention to provide a field frame assembly requiring a minimum amount of material by contouring the field member to effect a serpentine configuration providing an undulating exterior surface and a flux path cross section free of necked regions which would effect a flux choke in the field member.

An additional object of this invention is to provide a field frame assembly wherein a field member is provided with integral salient poles to accommodate a field winding having pole faces which intersect the pole sides and the pole ends substantially at right angles.

A further object of the present invention is to provide a field frame assembly employing two end frames and a field member wherein the field member has a serpentine configuration providing integral salient poles with pole faces which intersect the pole sidewalls and the pole end walls substantially at right angles and providing a flux path cross section free of necked regions which would effect a flux choke in the field member and wherein the end frames have a material thickness substantially less than the radial material thickness of the field member.

Additional objects and advantages of this invention will be apparent in light of the following description. The figures listed below are incorporated in the description and illustrate a preferred embodiment of the present invention. In the drawings.

Figure 1:
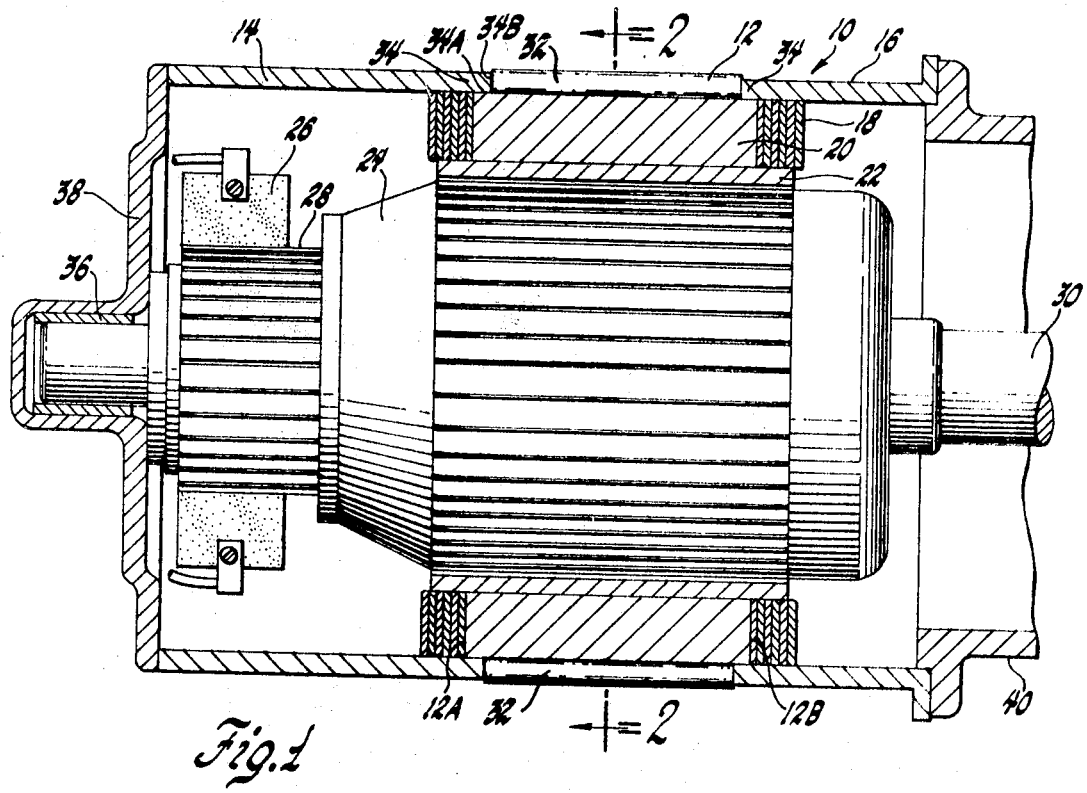
FIG. 1 is a view partly in section of a DC motor provided with a field frame constructed in accordance with the present invention.

Referring now to the drawings and more particularly to FIG. 1, a direct current dynamoelectric machine is shown which incorporates the field frame assembly of this invention. The dynamoelectric machine shown in FIG. 1 is a direct current motor to be used for cranking an internal combustion engine on a motor vehicle. The field frame assembly 10 of the direct current motor of FIG. 1 is comprised of a field member 12 and two end frames 14 and 16 secured respectively to the ends of the field member 12. A field coil 18 is retained in a desired fixed relation to the integral salient poles 20 of the field member 12 by arcuate pole plates 22. These pole plates 22 can be secured to the salient poles 20 by various known techniques such as spot welding or other mechanical fastening means. A rotor 24 is concentrically disposed within the field member 12 and it is supplied electrical excitation through commutator segments on the commutator 28 by brushes 26. A load shaft 30 provides a power output from the direct current motor and it can be connected with any load desired; particularly, the load shaft 30 can be connected with the drive pinion of a starter drive for cranking an internal combustion engine.

Figure 2:
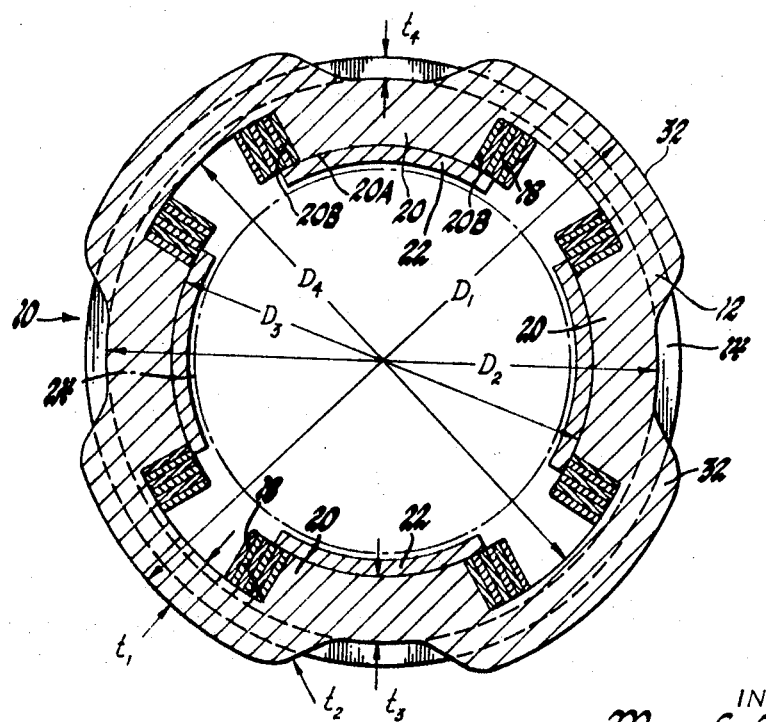
FIG. 2 is a cross section view of the field member of FIG. 1 with the rotor removed.

Referring now to FIG. 2, a sectional view of FIG. 1 is shown with the rotor removed. It is noted that the field member 12 of FIG. 1, as shown in FIG. 2, has a cylindrical serpentine configuration. Accordingly, the outer periphery of the field member 12 is provided with an undulating contour resulting in projections 32 intermediate the salient poles 20. As evident from FIG. 2 the field member 12 also is provided with an undulating interior portion. In the cranking motor of FIG. 2, the maximum outer diameter $D_1$ measured at the projections 32 intermediate the salient poles 20 is on the order of 4.50 inches and the outer diameter $D_2$ of the field member 12 measured at the integral salient poles 20 is on the order of 4.19 inches. Thus, it is seen that the contoured figuration shown in FIG. 2 effects a savings of material as a result of the smaller outer diameter $D_2$ of the field member at the salient poles 20 compared with the diameter $D_1$.

As shown in FIG. 2, the integral salient poles 20 are defined by arcuate axially extending pole faces 20A and axially extending radial planes 20B. As shown in FIG. 2, the arcuate pole faces 20A intersect the radial sidewalls 20B of the integral poles 20 substantially at right angles. The diameter $D_3$ of the cylindrical surface defined by the arcuate axially extending pole faces 20A of the four salient poles of FIG. 2 is on the order of 2.97 inches. The inner diameter $D_4$ of the field member 12 measured at the projections 32 is on the order of 3.88 inches. The integral poles 20 of FIGS. 1 and 2 extend the entire length of field member 12 terminating in the two planar end walls 12A and 12B of FIG. 1 which define the ends of the field member 12 and which are normal to the longitudinal axis of the field member 12.

It is noted that the material thickness $t_1$ of the projections 32 of FIG. 2 is on the order of 0.31 inch while the material thickness $t_2$ of the transition regions which join the salient poles 20 with the regions 32 intermediate the salient poles is on the order of 0.44 inch. Thus, it is seen that the field member 12 is free of necked regions in the transition regions which could affect a flux choke and serve as a detriment to motor operation by limiting circulating flux in operation.

In FIG. 2, it is seen that the radial material thickness $t_3$ at the poles 20 of the field member 12 is slightly greater than the radial material thickness $t_1$ at the regions 32 intermediate the poles. The radial material thickness $t_3$ is on the order of 0.56 inch and, as noted above, the thickness $t_1$ is on the order of 0.31 inch. This greater thickness at the poles 20 is required by the thickness of the field coil 18 of the particular configuration shown. With certain design changes in the field coil or the dimensions of the field member, the field member 12 could be fabricated with a substantially constant radial material thickness around the entire circumference of the member.

In FIG. 2, as well as in FIG. 1, it is seen that the end frame member 14 abuts the field member 12 along a groove or circumferentially extending region of reduced diameter 34 defined by circumferentially extending walls or land portions 34A and 34B. Likewise, the end frame 16 overlaps the end of field member 12 at a groove or region of reduced diameter 34. These two end frames are mechanically secured to the field member 12 by welding. In the alternative, various known fastening techniques could be employed to secure the end frames to the field member 12. As shown in FIGS. 1 and 2, the end frames 14 and 16 have a material thickness $t_4$ on the order of 0.13 inch which is substantially less than the thickness of the field member 12. This is most graphically illustrated in FIG. 2. In this manner, a substantial material savings is realized since a reduced material volume is required for the field frame assembly comprised of the end frames 14 and 16 and the field member 12.

The end frames provide means for supporting the rotor 24 interior to the field member 12. The bearing member 36 which is carried by end plate 38 accommodates one end of the rotor in a supporting fashion. The plate 38 is secured to end frame 12 by suitable known fastening techniques which are not illustrated. The end frame 16 is secured to a drive housing 40. Since this housing 40 is representative of various members to which the motor can be secured and since it forms no part of the present invention, only a partial view of the structure 40 is illustrated in FIG. 1. The shaft 30 is journaled in a bearing supported by housing 40 which is not illustrated.

The field member 12 may be manufactured by a number of methods. As one example, the method may include cutting steel blanks, die forming the blank to form a cylinder, seam welding the abutting edge, and then cold extruding to finished size. Other methods include: casting a cylinder from steel and cold extruding to finished size; and casting to contoured shape from steel and cold extruding to finished size. These various fabrication techniques allow the elimination of material from regions where it is not essential while simultaneously permitting control of material thickness in critical areas.

Dimensions used in the foregoing description describe a preferred embodiment of the invention. It will, of course, be appreciated that these dimensions may vary depending on the particular application of the field member.

We claim:

1. A field assembly, comprising: a unitary cylindrical direct current dynamoelectric machine field member comprised of magnetic material having substantially planar end faces located normal to the longitudinal axis of said field member, said field member having an undulating exterior and an undulating interior defining a serpentine configuration providing a plurality of integral salient poles projecting radially inward and extending axially the entire length of said field member, said integral poles having axially extending sidewalls extending the entire length of said field member, each of said integral poles defined by an arcuate pole face intersecting substantially perpendicularly said sidewalls and said planar end faces, a field coil disposed about said integral poles, and means for retaining said field coil in a fixed relation to said integral salient poles.

2. A field assembly, comprising: a unitary cylindrical direct current dynamoelectric machine field member comprised of magnetic material having substantially planar end faces located normal to the longitudinal axis of said field member, said field member having an undulating exterior and an undulating interior defining a serpentine configuration providing a plurality of integral salient poles projecting radially inward and extending axially the entire length of said field member, said integral poles having axially extending sidewalls extending the entire length of said field member, each of said integral poles defined by an arcuate pole face intersecting substantially perpendicularly said sidewalls and said planar end faces, a field coil disposed about said integral poles, means for retaining said field coil in a fixed relation to said integral salient poles, first and second end frames, each of said end frames having a material thickness substantially less than the radial material thickness of said field member, said field member having end portions contoured to telescope respectively into said end frames, said end frames abutting the land portions defining said contoured portions of said field member, and means for securing each of said end frames respectively to one end of said field member.

* * * * *